(12) United States Patent
Lefebvre et al.

(10) Patent No.: US 12,123,314 B2
(45) Date of Patent: Oct. 22, 2024

(54) SERVICE TUBE ASSEMBLY FOR A GAS TURBINE ENGINE

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/081,055

(22) Filed: Oct. 27, 2020

(65) Prior Publication Data
US 2022/0127974 A1 Apr. 28, 2022

(51) Int. Cl.
| | | |
|---|---|---|
| F01D 25/18 | (2006.01) | |
| F02C 7/20 | (2006.01) | |
| F16L 15/02 | (2006.01) | |
| F16L 27/12 | (2006.01) | |

(52) U.S. Cl.
CPC ............... *F01D 25/18* (2013.01); *F02C 7/20* (2013.01); *F16L 15/02* (2013.01); *F16L 27/1274* (2019.08); *F05D 2260/60* (2013.01); *F05D 2260/98* (2013.01); *F16L 27/12751* (2019.08)

(58) Field of Classification Search
CPC ... F16L 15/02; F16L 27/127; F16L 27/12751; F16L 27/1274; F16L 37/505
See application file for complete search history.

(56) References Cited

U.S. PATENT DOCUMENTS

| | | | | |
|---|---|---|---|---|
| 1,573,511 A | * | 2/1926 | Belcher | F16L 27/12751 285/302 |
| 2,126,857 A | * | 8/1938 | Yancey | E21B 33/03 285/356 |
| 2,449,588 A | * | 9/1948 | Clafford | F16L 15/02 285/382.7 |
| 2,497,987 A | * | 2/1950 | Goode | F16L 15/02 285/354 |
| 3,180,659 A | * | 4/1965 | Pierre | F16L 15/008 285/332 |

(Continued)

FOREIGN PATENT DOCUMENTS

| | | | |
|---|---|---|---|
| CH | 495526 A | * | 8/1970 |
| DE | 884256 C | * | 7/1953 |

(Continued)

OTHER PUBLICATIONS

Monroe Engineering, "What are the Pros and Cons of Titanium?", May 11, 2016, "https://monroeengineering.com/blog/pros-and-cons-of-titanium/" (Year: 2016).*

(Continued)

*Primary Examiner* — Zachary T Dragicevich
*Assistant Examiner* — Alexander T Rufrano
(74) *Attorney, Agent, or Firm* — NORTON ROSE FULBRIGHT CANADA LLP (57) ABSTRACT

A gas turbine engine has a service tube assembly including an adjustable joint having a flange axially movable along an end fitting having a male/female connection with a mating part. The flange is threadably engaged with the end fitting to provide for the adjustment of the position of the flange along the end fitting.

16 Claims, 5 Drawing Sheets

(56) References Cited

U.S. PATENT DOCUMENTS

| | | | | |
|---|---|---|---|---|
| 5,160,174 | A | * | 11/1992 | Thompson .......... F16L 27/1275 285/298 |
| 8,978,763 | B2 | * | 3/2015 | Guidry .............. F16L 27/12751 166/308.1 |
| 9,068,450 | B2 | * | 6/2015 | Guidry ................ E21B 43/2607 |
| 10,132,146 | B2 | * | 11/2018 | Guidry ................... E21B 19/00 |
| 11,105,175 | B2 | * | 8/2021 | Chirko ................. E21B 33/068 |
| 11,214,455 | B2 | * | 1/2022 | McGuire .............. F16L 27/125 |
| 2006/0197342 | A1 | * | 9/2006 | Yen ..................... F16L 27/1274 285/298 |
| 2010/0207379 | A1 | * | 8/2010 | Olver ................... F16L 23/167 277/320 |

FOREIGN PATENT DOCUMENTS

| | | | |
|---|---|---|---|
| DE | 3515169 A1 | * | 11/1985 |
| FR | 407965 A | * | 3/1910 |
| GB | 873886 A | | 9/1961 |
| GB | 996228 A | * | 6/1965 |
| JP | H084961 A | * | 1/1996 |
| WO | 20150132540 A1 | | 9/2015 |

OTHER PUBLICATIONS

The Constuctor, Different Types of Pipe Joints in Plumbing, Jan. 16, 2017, "https://web.archive.org/web/20170116213314/http://theconstructor.org/building/types-of-pipe-joints-in-plumbing/12559/" (Year: 2017).*

Tanslation of JPH084961A Dimension Adjusting Pipe Joint (Year: 1996).*

European Search Report issued in counterpart application 21204797.1 on Mar. 24, 2022.

* cited by examiner

SERVICE TUBE ASSEMBLY FOR A GAS TURBINE ENGINE

TECHNICAL FIELD

The application relates generally to gas turbine engines and, more particularly, to service tube assemblies.

BACKGROUND OF THE ART

Service tubes fluidly couple different portions of a gas turbine engine or couple portions of the engine to other associated components, such as aircraft components. The service tubes can, for instance, supply oil or an oil/air mixture to and/or from the engine and between the different portions of the engine. Due to tolerance stack-up, the tube ends may not always perfectly coincide with their points of attachment on the engine. Such tolerance stack-up may result in undesirable stresses in the tubes at cold assembly.

Tube assembly alternatives are, thus, desirable.

SUMMARY

In one aspect, there is provided a service tube assembly for a gas turbine engine, comprising: a first service tube having a first fitting and a first abutment surface; a second service tube having a second fitting and a second abutment surface, the second fitting engaged in a male/female connection with the first fitting, the second abutment surface threadably engaged with a threaded portion of the second fitting to adjustably position the second abutment surface along the second fitting at a location where the second abutment surface abuts the first abutment surface of the first service tube; and a fastener clamping the first and second abutment surfaces together.

In another aspect, there is provided a service tube assembly for a gas turbine engine, comprising: an engine component having a first fitting and an abutment surface; a service tube fluidly connected to the engine component, the service tube having a second fitting at one end thereof, the second fitting engaged in a male/female connection with the first fitting of the engine component, the second fitting having a threaded portion and a second abutment surface threadably engaged with the threaded portion for adjusting a position of the second abutment surface along the second fitting so as to bring the second abutment surface in abutment against the first abutment surface; and a fastener clamping the first and second abutment surfaces together.

In a further aspect, there is provided a method for installing a fluid line between first and second ports of a gas turbine engine, the method comprising: pre-assembling first and second tubes in an adjustable male/female connection so as to form an adjustable joint therebetween, connecting an opposed end of the first tube to the first port; connecting an opposed end of the second tube to the second port, adjusting a position of an adjustable flange on the second tube to bring the adjustable flange in abutment against a corresponding flange on the first tube at the adjustable male/female connection, wherein adjusting the position of the adjustable flange comprises threading or unthreading the adjustable flange on a threaded portion of the second tube; and clamping the first and second flanges together to secure the male/female connection.

In a still further aspect, a service tube assembly for a gas turbine engine, comprising: a first service tube having a first fitting at one end thereof, the first fitting having a first flange; a second service tube having a second fitting at one end thereof, the second fitting engageable in a male/female connection with the first fitting, the second fitting having a threaded portion and a second flange threadably engaged with the threaded portion to adjust a position of the second flange along the second fitting, the second flange movable to a position in which the second flange abuts the first flange; and fasteners engageable in registering holes defined in the first and second flanges for clamping the first and second flanges together.

DESCRIPTION OF THE DRAWINGS

Reference is now made to the accompanying figures in which.

DETAILED DESCRIPTION

Figure 1:
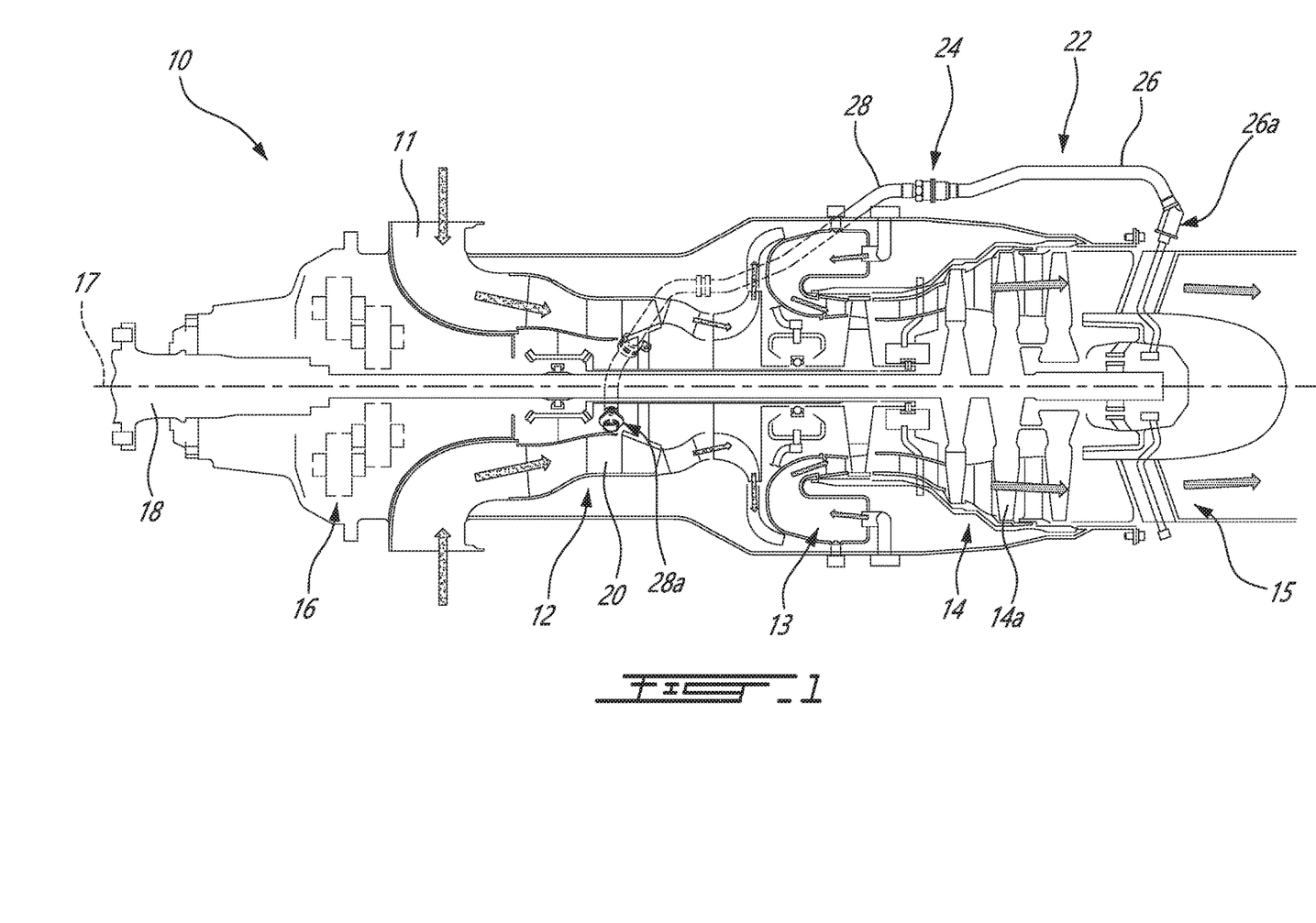
FIG. 1 is a schematic cross-section view of a gas turbine engine having a tube assembly with an adjustable joint between a compressor and an exhaust section of the engine.

FIG. 1 illustrates a gas turbine engine 10 of a type preferably provided for use in subsonic flight, generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the engine 10. The turbine 14 includes a low pressure or power turbine 14a drivingly connected to an input end of a reduction gearbox RGB 16. The RGB 16 has an output end drivingly connected to an output shaft 18 configured to drive a rotatable load (not shown). The rotatable load can, for instance, take the form of a propeller or a rotor, such as a helicopter main rotor. The gas turbine engine 10 has an engine centerline 17. According to the illustrated embodiment, the compressor and the turbine rotors are mounted in-line for rotation about the engine centerline 17.

The gas turbine engine 10 has an axially extending central core which defines an annular gaspath 20 through which gases flow, as depicted by flow arrows in FIG. 1. It is understood that the engine could adopt different configurations, the engine configuration illustrated in FIG. 1 being provided for context purposes only. For instance, the engine could be configured as a turboprop, a turboshaft, a turbofan or an auxiliary power unit (APU) in a through flow or reverse flow arrangement.

As schematically exemplified in FIG. 1, the engine 10 is equipped with a plurality of tubes for transporting a fluid, such as oil, coolant, air, a liquid-gas mixtures (e.g. an oil-air mixture) or fuel, between different portions of the gas turbine engine 10. These tubes are herein referred to as service tubes and include, among others, tubes used to supply oil to a bearing sump (an "oil supply tube"), to drain spent oil from the bearing sump (a "drain" or "scavenge tube"), to pressurize the bearing sump with air (a "pressure tube"), and to vent air from the bearing sump (a "ventilation tube").

More particularly, FIG. 1 illustrates an exemplary service tube assembly 22 used to covey a fluid (e.g. oil, air, an oil-air mixture) between the compressor 12 and the exhaust 15. However, it is understood that the tube assembly 22 could be used to fluidly interconnect other portions of the engine 10 and to convey fluids other than oil, air or an air-oil mixture, the illustrated embodiment being representative of only one of the contemplated applications.

In practice, the exact position of the points of attachment to the compressor 12 and the exhaust 15 at opposed ends of the tube assembly 22 may vary due to the accumulation of tolerance stack-up at assembly. Therefore, the tube(s) may need to be slightly deformed to permit joining of the tube extremities to the associated points of attachment on the engine. In some instances, this may induce undesirable stresses in the tubes. For instance, the inherent resiliency of "stiff" materials, such as titanium, may result in undue stress in the tubes at cold assembly when the tube extremities do not perfectly mate with the associated fixed attachment points on the engine. Accordingly, ductile materials (i.e. less stiffer materials), such as Inconel alloy 625 or stainless steel (SST), are typically used to accommodate tube deformation at assembly. However, Inconel alloy 625 and stainless steel tubes are heavier than titanium tubes, resulting in heavier engines. It is thus desirable to reduce the stress induced in the service tubes at cold assembly.

As will be seen herein after, the service tube assembly 22 has an adjustable joint 24 to accommodate the accumulation of tolerance stack-up (and thus the geometrical and position variations at the points of attachment of the service tubes) and, thus, reduce or mitigate installation stresses induced in the tubes at cold assembly. This may provide more flexibility in the choice of materials for the tubes. For instance, it may allow to replace conventional IN625 or SST tubes with stiffer and lighter tubes, such as titanium tubes, in a gas turbine engine oil line extending from the compressor 12 to the exhaust 15 and that without compromising the oil line integrity.

Figure 2:
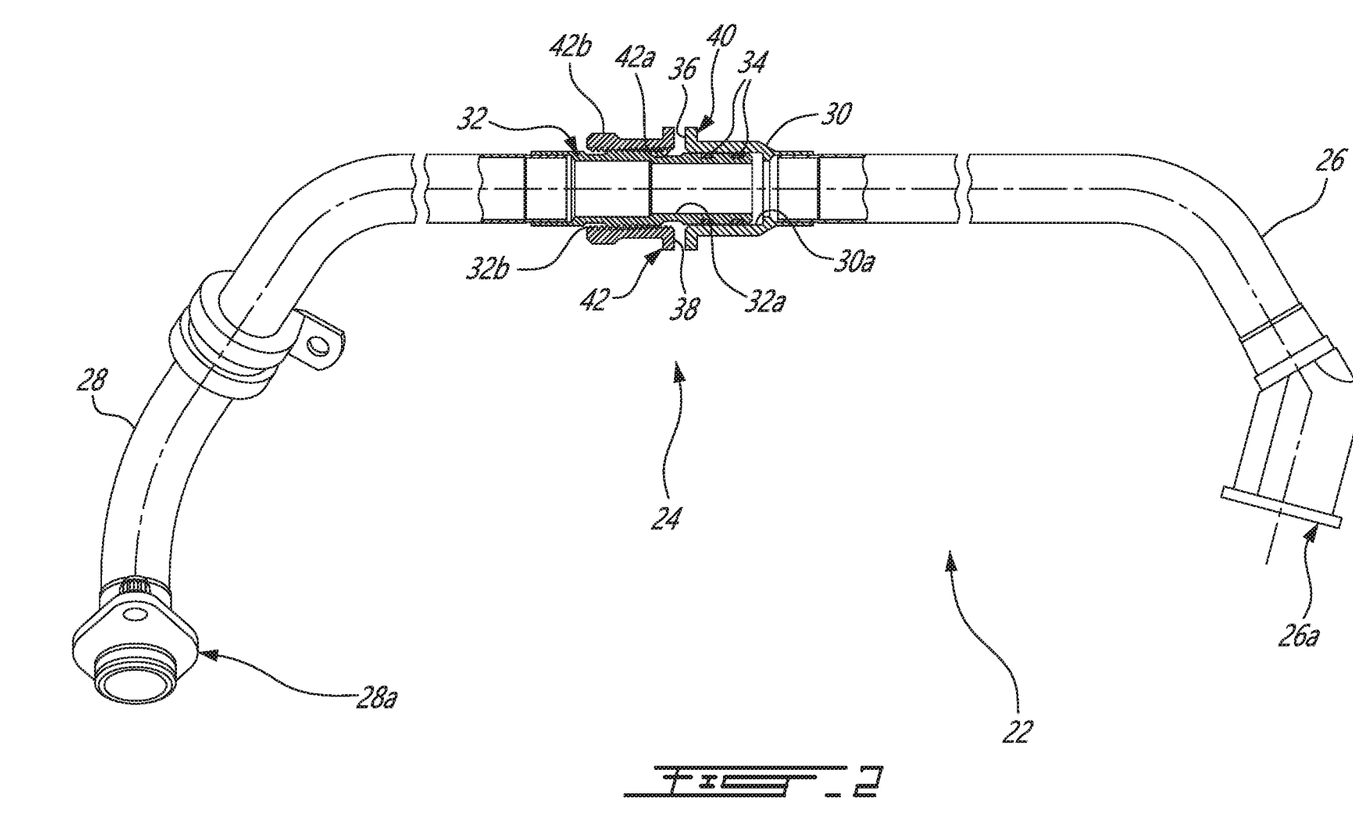
FIG. 2 is a schematic cross-section view of the tube assembly illustrating the adjustable joint in a partially engaged state.
Figure 4:
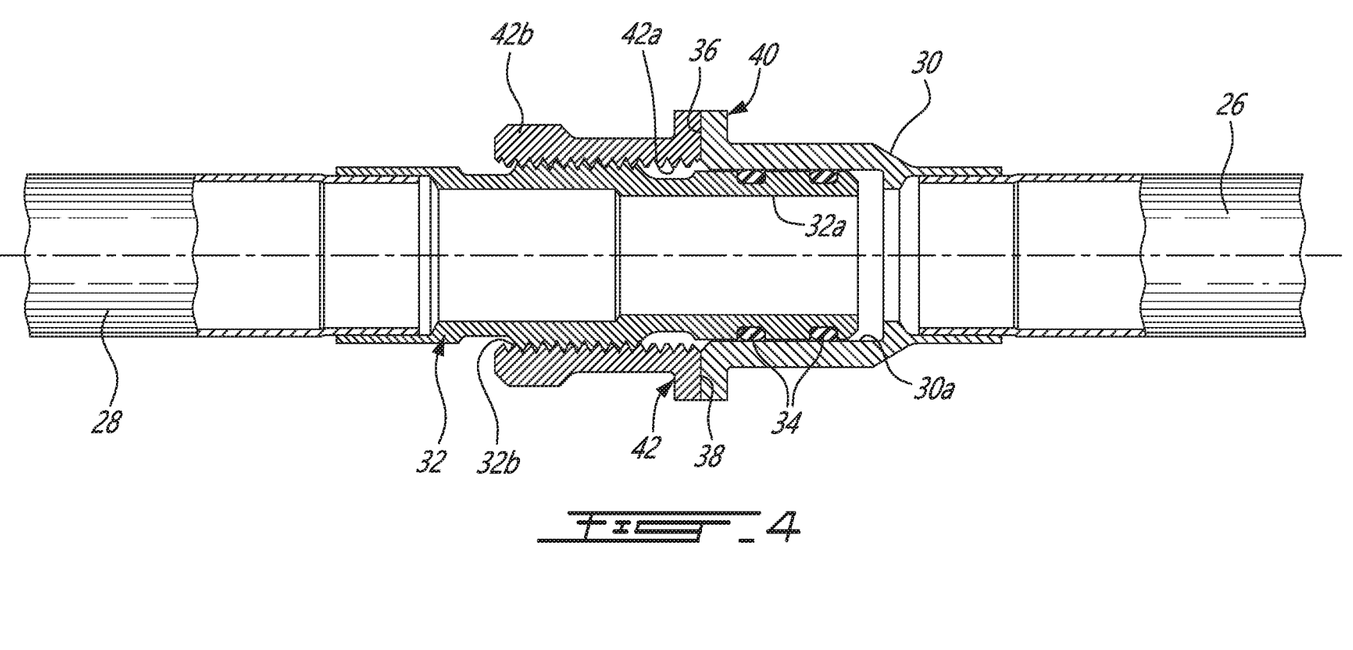
FIG. 4 is an enlarged cross-section view illustrating details of the adjustable joint.

Referring jointly to FIGS. 1, 2 and 4, it can be seen that the exemplified service tube assembly 22 comprises a first tube 26 and a second tube 28 joined together at the adjustable joint 24. The adjustable joint 24 comprises first and second fittings 30, 32 respectively provided at the adjoining ends of the first and second tubes 26, 28. The first and second fittings 30, 32 can be brazed or otherwise suitably secured to the adjoining ends of the first and second tubes 26, 28, respectively. As shown in FIG. 2, the first and second fittings 30, 32 are engaged in male/female connection. According to the illustrated example, the second fitting 32 has a cylindrical male portion 32a adjustably, axially insertable in sealing engagement within a corresponding cylindrical female portion 30a of the first fitting 30. However, it is understood that the male/female role between the first and second fittings 30, 32 could be inversed (i.e. the first fitting could have a male portion extending into a female portion of the second fitting). A seal is provided between the male and female portions 32a, 30a. According to the illustrated example, the seal is provided in the form of a pair of axially spaced-apart O-rings 34 mounted in corresponding annular grooves defined in the outer circumferential surface of the male portion 32a of the second fitting 32 and axially positioned for engagement with a radially inner circumferential surface of the female portion 30a of the first fitting 30. It is understood that more or less O-rings or seals could be provided along the male portion 32a of the first fitting 32.

Still referring to FIGS. 2 and 4, the first tube 26 has a first abutment surface 36 fixedly positioned at the distal end of the first fitting 30. The second tube 28 has a second abutment surface 38 adjustably mounted to the second fitting 32. According to the illustrated example, the first and second abutment surfaces 36, 38 are respectively provided on a first flange 40 and a second flange 42. As can be appreciated from FIGS. 2, 3a, 3b and 4, the position of the first flange 40 is fixed at the distal end of the first fitting 30 and the position of the second flange 42 is axially adjustable along the second fitting 32.

Figure 3A:
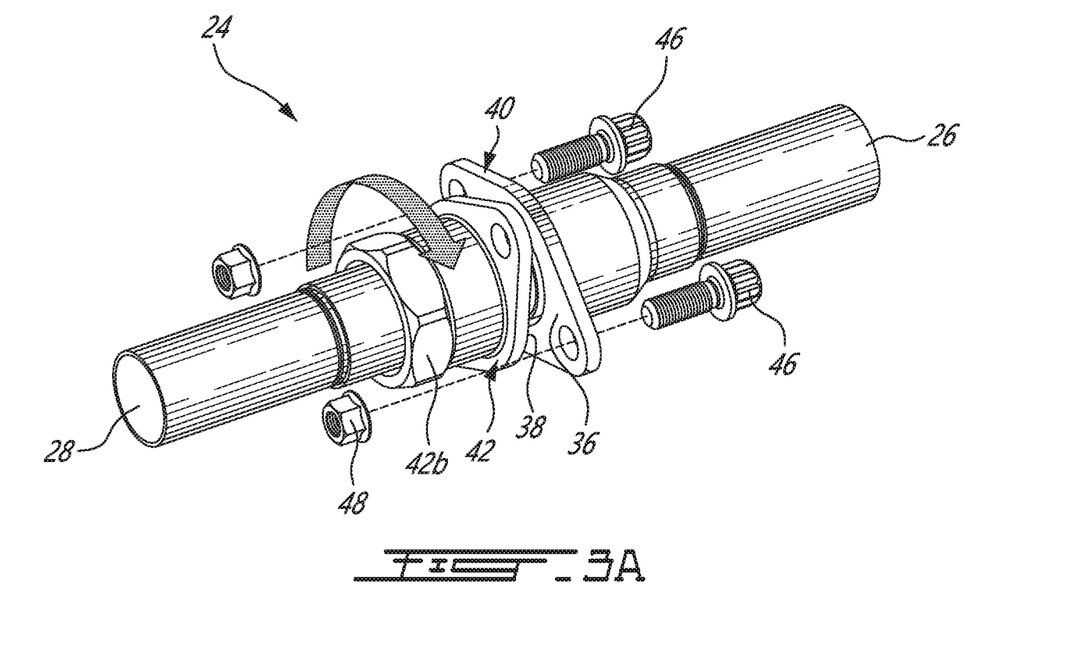
FIGS. 3a and 3b are isometric views of the adjustable joint respectively shown in a partially and a fully assembled state.
Figure 3B:
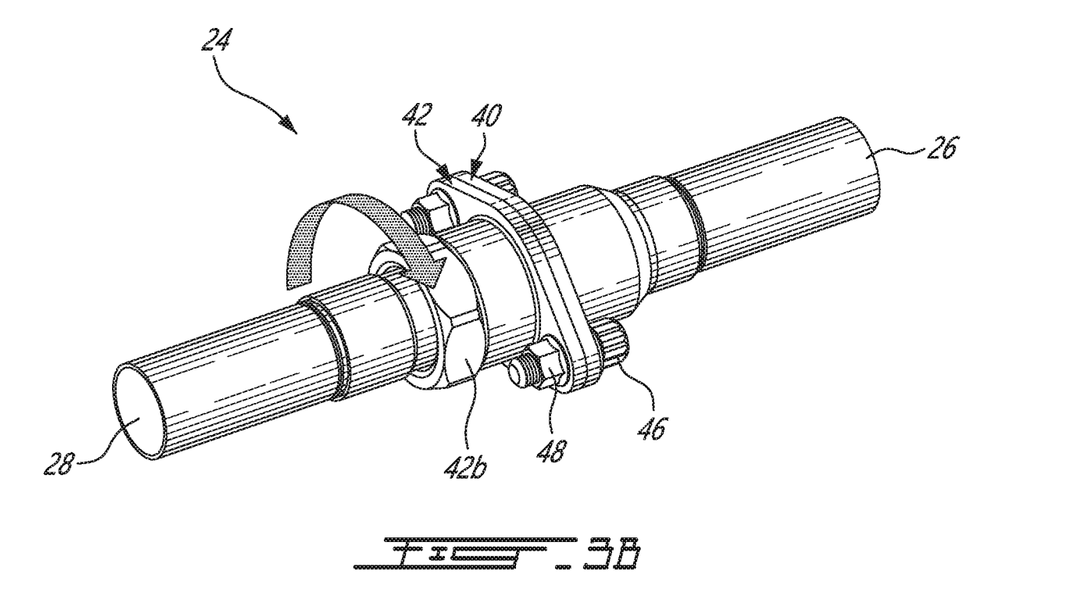

According to the illustrated example, the second flange 42 has a threaded portion 42a threadably engaged with a corresponding threaded portion 32b on the second fitting 32. According to the illustrated example, the second flange 42 has a tubular body including inner threads formed at an inner diameter thereof for threaded engagement with corresponding outer threads provided on an outer surface of the second fitting 32. The male portion 32a of the second fitting 32 projects axially beyond the threaded portion 32b. Stated differently, the threaded portion 32b is disposed axially inboard of the distal male portion 32a of the second fitting 32. The axial position of the second flange 42 along the second fitting 32 can be adjusted so that the male portion 32a projects more or less from the second flange 42. The position of the second flange 42 can be adjusted by simply rotating the second flange 42 on the second fitting 32. As shown in FIGS. 3a and 3b, the tubular body of the second flange 42 can have a hexagonal end portion 42b for engagement with a tool, such as a wrench.

The tube assembly 22 is installed on the engine 10 by first inserting the male portion 32a of the second fitting 32 of the second tube 28 into the female portion 30a of first fitting 30 of the first tube 26. At this preliminary stage of assembly, the pre-assembled first and second tubes 26, 28 are adjustably telescopically engaged and free to axially move relative to one another. Once the adjustable extremity of the second tube 28 has been so engaged with the adjoining extremity of the first tube 26, the opposed ends 26a and 28a of the first and second tubes 26, 28 are securely connected to their respective points of connection/attachment on the exhaust 15 and the compressor 12. Thereafter, the second flange 42 (i.e. the threaded flange) is rotated on the second fitting 32 so as to bring the second abutment surface 38 firmly against the first abutment surface 36 of the first flange 40 at the distal end of the first fitting 30 of the first tube 26. This can be appreciated from FIGS. 3a and 3b. After having firmly abutted the second abutment surface 38 against the first abutment surface 36, the first and second abutment surfaces 36, 38 are clamped together. This can be accomplished in a variety of ways and through the use of different fasteners. For instance, according to the embodiment illustrated in FIGS. 2, 3a and 3b, the first and second flanges 40, 42 can be bolted together. According to one aspect, the second flange 42 can be provided with a pair bolt holes for alignment with corresponding bolt holes in the first flange 40 (see FIG. 3a). Accordingly, once the second flange 42 has been brought into firm engagement with the first flange 40, the angular position of the second flange 42 relative to the first flange 40 is adjusted to bring the bolts holes of the flanges 40, 42 in registry. Then, bolts 46 are inserted through the registering holes and nuts 48 threaded on the bolts 46 to secure the assembly as shown in FIG. 3b.

According to one aspect, the adjustable flange and male/female connection allow to eliminate or at least reduce the stresses resulting from the accumulation of tolerance stack-up at assembly. According to another aspect, after the second flange 42 has been brought in firm contact against the first flange 40, the second flange 42 can be further rotated by a predetermined number of turns so as to pre-load the tube assembly in such a way as to counteract stresses resulting from thermal expansion during engine operation. The adjustable joint 24 may thus accommodate thermal effects and tolerance stack-up with its male-female interaction and adjustable clamping assembly.

Figure 5:
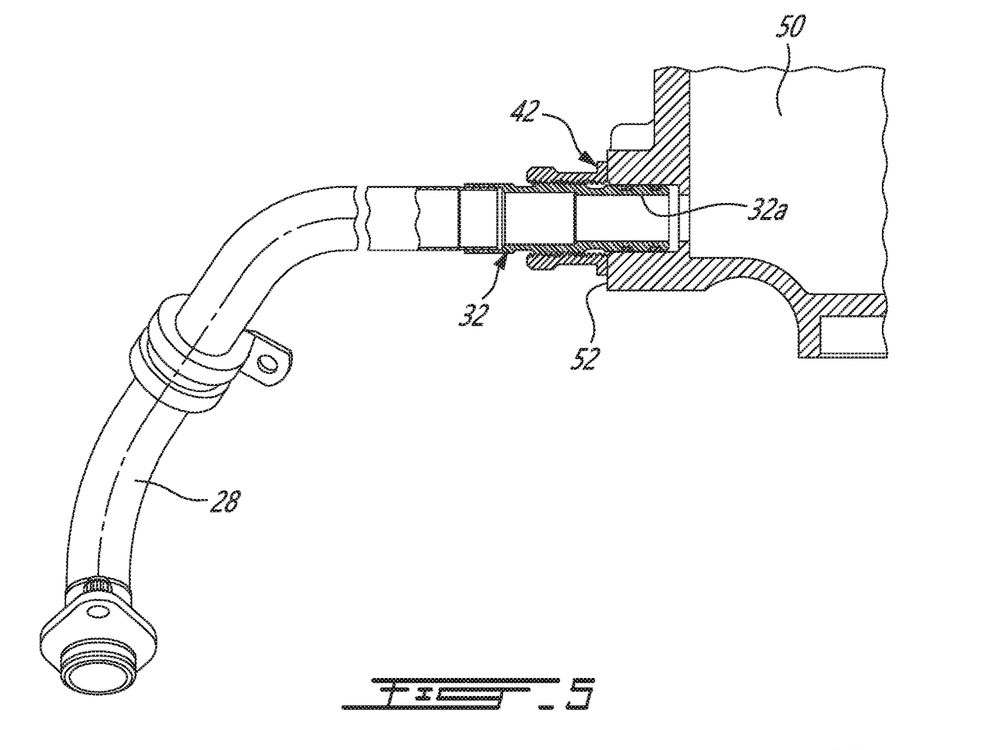
FIG. 5 is a cross-section view of another example of a tube assembly in which a service tube is fluidly connected to an engine component, such as an accessory unit.

Now referring to FIG. 5, it can be appreciated that the above described adjustable joint is not limited to a junction between two service tubes but could also be applied at the interface or connection between a service tube an any other mating components. For instance, the second tube 28 with its threaded flange 42 could be used to fluidly connect the second service tube 28 to an accessory unit 50, such as a pump or the like. According to this embodiment, the accessory unit 50 has a fixed mounting surface 52 defining a port 54 for receiving the male portion 32*a* of the second fitting 32 in a male/female connection. Holes (not shown) are defined in the mounting surface 52 for alignment with the bolt holes in the adjustable flange 42 of the service tube 28. The position of the adjustable flange 42 is adjusted to firmly abut the flange 42 in abutment against the mounting surface 52 and to align the bolt holes on the flange 42 in registry with the bolt holes in the mounting surface 52 of the accessory unit 50.

Figure 6:
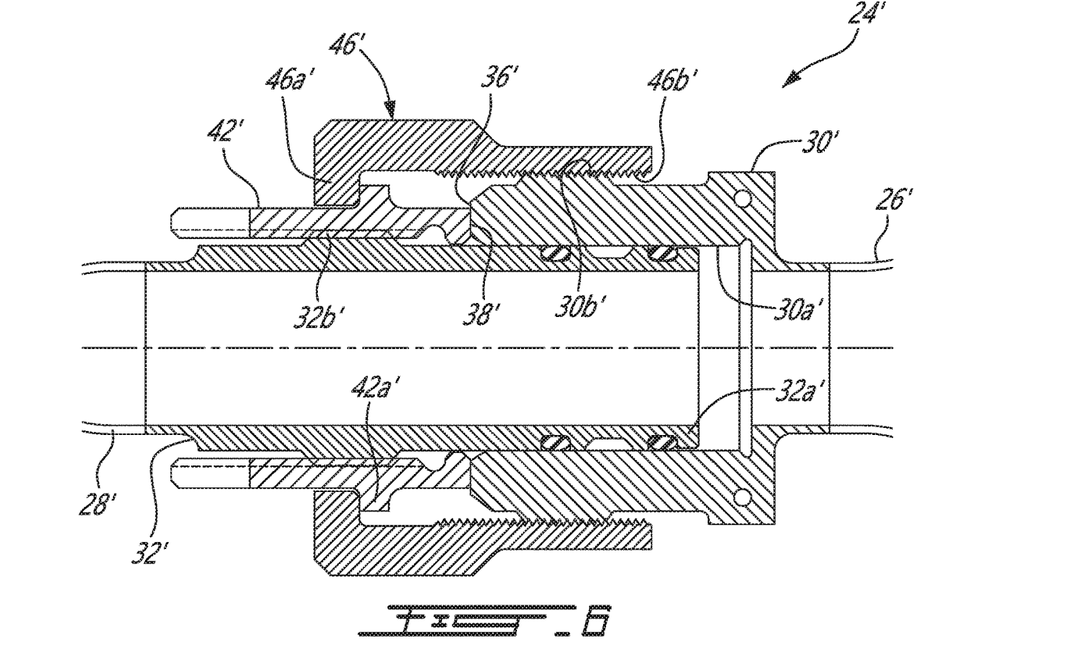
FIG. 6 is an enlarged cross-section view of a further example of an adjustable joint between two service tubes.

FIG. 6 illustrates another embodiment of an adjustable joint 24' with a male/female connection between two service tubes 26', 28'. According to this embodiment, the first abutment surface 36' of the first service tube 26' is provided at the distal end of the first fitting 30' around the female portion 30*a'* receiving the male portion 32*a'* of the second fitting 32' of the second tube 28'. The second abutting surface 38' is provided at the end of an adjustable nut 42' threadably engaged with the externally threaded portion 32*b'* of the second fitting 32'. As can be appreciated from FIG. 6, the axial position of the nut 42' on the second fitting 32' can be adjusted by rotating the nut 32' until it axially abuts against the terminal end (the first abutment surface) of the first fitting 30' of the first service tube 26'. According to this embodiment, the first and second abutment surfaces 36', 38' are clamped together by a single fastener. The fastener may be provided in the form of a hexagonal tube fitting 46' having an inner annular shoulder 46*a'* at a first end portion thereof engaged behind a corresponding outer annular shoulder 42*a'* projecting from the adjustable nut 42'. The hexagonal tube fitting 46' has inner threads 46*b'* at a second end portion for threaded engagement with corresponding outer threads 30*b'* formed on an outer surface of the first fitting 30' of the first tube 26'. The hexagonal tube fitting 46' can thus be tightened on the first fitting 30' to firmly axially clamp the first and second abutment surfaces 36', 38' together after the position of the nut 42' has been adjusted to compensate for the accumulation of the tolerance stack-up at assembly.

According to one aspect, at least some of the above described embodiments allows for the installation of tubing in a gas turbine engine that a substantial cold stack up variation. The provision of a tube assembly with an adjustable joint may allow to compensate for build stack-up accumulation and thus to lower stress in the service tubes.

According to a further aspect, the adjustable joint comprises a rotatable flange using a threaded feature to axially position the abutment surface at the resultant axial position. This may allow to accommodate some engine length variations due to manufacturing tolerances.

At least some embodiments allow for the use of stiffer tube material, such as titanium tubing. It provides more flexibility in the choice of material for the service tubes. For instance, it may allow for the use of lighter tubes.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, an additional O-ring could be positioned on the male portion of the second fitting to seal against the inner surface of the adjustable flange. Yet further modifications could be implemented by a person of ordinary skill in the art in view of the present disclosure, which modifications would be within the scope of the present technology.

The invention claimed is:

1. A service tube assembly for a gas turbine engine of an aircraft, comprising:
   a first titanium service tube configured for aerospace applications, the first titanium service tube defining one or more bends;
   a first fitting attached to the first titanium service tube, the first fitting having a first abutment surface;
   a second titanium service tube configured for aerospace applications, the second titanium service tube defining one or more bends;
   a second fitting attached to the second titanium service tube, the second fitting including an adjustable flange having a second abutment surface, the second fitting engaged in a male/female connection with the first fitting, the adjustable flange having a one-piece tubular body directly threadably engaged with a threaded portion of the second fitting to adjustably position the second abutment surface along the second fitting at a location where the second abutment surface abuts the first abutment surface of the first titanium service tube, the second abutment surface of the adjustable flange angularly adjustable about the second fitting in response to a rotation of the one-piece tubular body relative to the second fitting; and
   fasteners engageable in registering holes defined in the first and second abutment surfaces, the fasteners clamping the first and second abutment surfaces together, the first and second abutment surfaces having a point of contact disposed radially outwardly from the fasteners relative to a central axis of the service tube assembly, and wherein a radially innermost end of the second abutment surface is in direct contact with a radially innermost end of the first abutment surface.

2. The service tube assembly according to claim 1, wherein the first abutment surface is part of a fixed flange extending from the first fitting, and wherein the fasteners comprises a pair of fasteners extending through registering holes defined in the first abutment surface of the fixed flange and the second abutment surface of the adjustable flange.

3. The service tube assembly according to claim 2, wherein the pair of fasteners includes first and second sets of bolts and nuts.

4. The service tube assembly according to claim 2, wherein the threaded portion includes external threads provided on an outer surface of the second fitting, and wherein the adjustable flange has internal threads threadably engaged with the external threads.

5. The service tube assembly according to claim 4, wherein the second fitting has a male portion projecting beyond the threaded portion for mating engagement within a female portion of the first fitting.

6. The service tube assembly according to claim 5, wherein the male portion carries a seal for sealing engagement with an inner surface of the first fitting.

7. The service tube assembly according to claim 6, wherein the seal includes axially spaced-apart O-rings disposed in corresponding grooves defined on the male portion.

8. The service tube assembly according to claim 5, wherein the first and second abutment surfaces surround the male portion.

9. The service tube assembly according to claim 1, wherein the first titanium service tube and the second titanium service tube are oil supply tubes, oil scavenge tubes, air pressure tubes or vent tubes.

10. The service tube assembly according to claim 9, wherein the first fitting and the second fitting are respectively brazed to the first titanium service tube and the second titanium service tube.

11. The service tube assembly according to claim 1, wherein the one-piece tubular body of the adjustable flange has an hexagonal end portion for engagement with a torque applying tool.

12. A service tube assembly for a gas turbine engine of an aircraft, comprising:
   a first titanium service tube configured for aerospace applications, the first titanium service tube defining one or more bends;
   a first fitting attached to an end of the first titanium service tube, the first fitting having a first flange;
   a second titanium service tube configured for aerospace applications, the second titanium tube defining one or more bends;
   a second fitting attached to an end of the second titanium service tube, the second fitting engageable in a male/female connection with the first fitting, the second fitting having a threaded portion and a second flange, the second flange having a one-piece tubular body with internal threads defined on an inner surface thereof, the internal threads directly threadably engaged with the threaded portion of the second fitting to form a threaded connection, the threaded connection operable to adjust a position of the second flange along the second fitting, the second flange movable to a position in which the second flange abuts the first flange; and
   fasteners engageable in registering holes defined in the first and second flanges for clamping the first and second flanges together, the first and second flanges axially abutting each other both radially inwardly and radially outwardly from the fasteners relative to a central axis of the service tube assembly, the registering holes angularly adjustably aligned via the threaded connection between the one-piece tubular body and the second fitting, and wherein a radially innermost end of the second flange is in direct contact with a facing radially innermost end of the first flange.

13. The service tube assembly according to claim 12, wherein the threaded portion has external threads provided on an outer surface of the second fitting for engagement with the internal threads of the second flange.

14. The service tube assembly according to claim 13, wherein the second fitting has a male portion projecting beyond the threaded portion for mating engagement within the first fitting.

15. The service tube assembly according to claim 14, wherein the male portion carries a seal for sealing engagement with an inner surface of the first fitting.

16. The service tube assembly according to claim 15, wherein the seal includes axially spaced-apart O-ring seals.

* * * * *